Oct. 23, 1956 P. E. ANDERSON 2,767,575
BALL CRUSHER TYPE FORCE GAGE
Filed Sept. 15, 1954
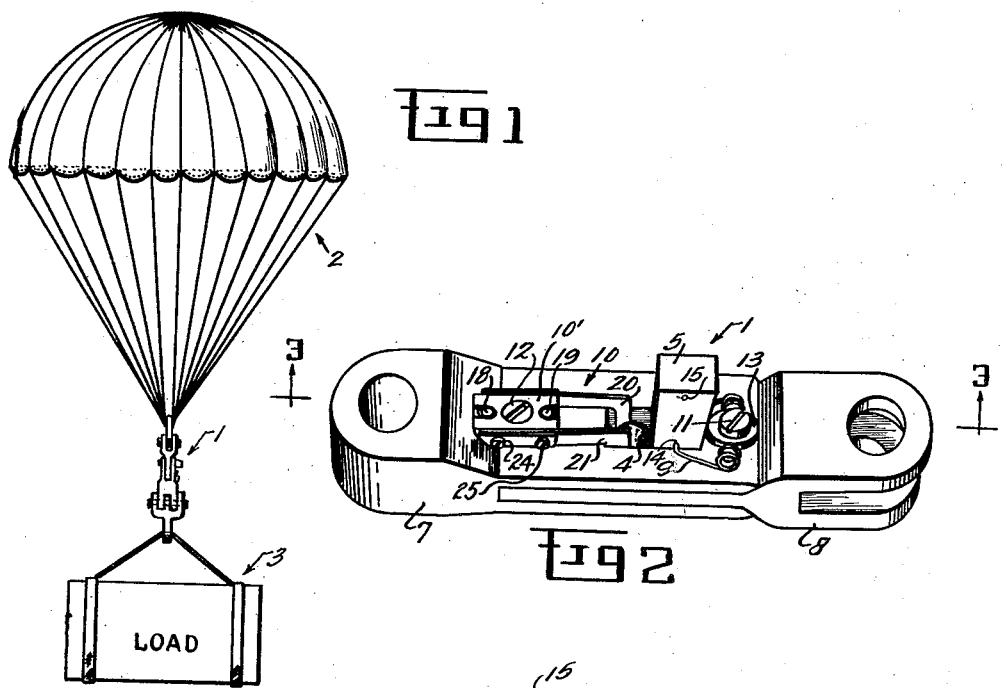
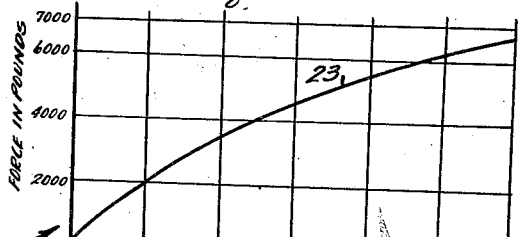
INVENTOR.
PAUL E. ANDERSON
BY
ATTORNEYS United States Patent Office 2,767,575
Patented Oct. 23, 1956

2,767,575
BALL CRUSHER TYPE FORCE GAGE

Paul E. Anderson, Torrance, Calif., assignor to the United States of America as represented by the Secretary of the Air Force Application September 15, 1954, Serial No. 456,348

5 Claims. (Cl. 73—141)

This invention pertains to a ball crusher type of force gage which by degree of ball deformation records the maximum forces applied to the gage.

Rocket construction, operation, testing and the like inclusive of the investigations of internal rocket launching installations, have required the development of a device or instrument for recording maximum force delivery in places where environmental conditions of blast force, flame proximity and the like, have prohibited the use of electrical or other previously available gages. The gage described herein has been developed to provide a simply and successfully operating device which is applicable for use under the described conditions.

An object of the present invention is to provide a ball pressure and preferably a ball crusher type of force gage for measuring and recording rocket performance.

Another object is to provide a force gage which is capable of accurate and dependable results under extreme conditions of force application, temperature, and the rate and magnitude of applied stresses.

A further object is to provide a force gage with calibration charts for use in the measuring of and in the recording of forces applied to the gage.

An operative embodiment of the present invention is shown in the accompanying drawing wherein:

Figure 1 is an illustrative use of a gage which embodies the present invention between a parachute and a load;

Figure 2 is a perspective view from above of the gage shown in Figure 1;

Figure 3 is an enlarged fragmentary, sectional view of the gage in Figure 2 taken along the line 3—3 thereof;

Figure 4 is an enlarged perspective view of the wedge in the device shown in Figures 2 and 3; and Figure 5 is a force gage calibration curve graph for use with the gage device shown in Figures 2 and 3.

The ball crusher type of force gage 1 shown under tension in Figure 1 measures the thrust of a rocket, the gravity pull on a parachute 2 by a jeep or other load 3 dropped from a cargo aircraft, or the like.

The gage preferably comprises a deformable ball 4 positioned between the substantially parallel faces of an indeformable wedge 5 and an indeformable anvil 6 such that a force to be measured is applied to and deforms the ball. The ball 4 is of precision construction and of closely controlled composition for purposes of reproducible deformation under compression forces applied along a diameter of the ball. The ball 4 is deformed by compression in a measurable amount by tension forces pulling the clevises or forks 7 and 8 in opposite directions. The magnitude of the force is read from a force gage calibration curve graph shown in Figure 5.

The clevis 7 is bifurcated toward the right to receive the left hand tongue end of the clevis 8 therebetween. The wedge 5 is spring pressed downwardly of the assembly by a coil spring 9. Wedge receiving apertures in the bifurcated end of the clevis 7 are aligned with wedge receiving apertures in the tongue of the clevis 8 to receive the wedge 5 therewithin. The wedge receiving apertures in the overlapping parts of the clevises 7 and 8 are dimensioned longitudinally of the assembly to permit the adjustment of the wedge 5 therein for accommodating differences in the size of the ball 4 and so that the ball is contacted firmly between the anvil and the wedge.

The ball 4 is yieldingly held in position about midway between the lateral edges of the assembly by a ball retainer 10. The coil spring 9 is attached by a screw 11 to the right hand end of the upper tine of the clevis 7. The ball retainer 10 is attached by a screw 12 to adjacent the left hand end of the upper tine of the clevis 7. A washer 13 between the head of the screw 11 and a semicircular mid-part of the coil spring 9 provides an enlarged and a firm grip on the spring 9. The unattached ends of the spring 9, remote from the spring mid-portion under the washer 13, are directed toward each other and yieldingly enter a pair of sockets 14 in the opposite sides of the wedge 5 for the size of the ball 4 which is shown in the drawings. For a ball of smaller diameter than the ball 4 shown, another pair of sockets 15 in opposite sides of the wedge 5 an appropriate distance above the pair of spring tip housing sockets 14 are provided to receive the opposed tips of the wedge retaining spring 9. When a smaller ball than the ball 4 is used the wedge 5 is correspondingly lowered in the apertures in the overlapping parts of the clevises 7 and 8. The lower end of the spring retaining screw 11 preferably extends into an axially elongated slot 16 in the right hand end of the tongue of the clevis 8. The lower end of the screw 12, which secures the ball retainer 10 in the assembly, preferably extends into a slot 17 in the left hand end of the tongue of the clevis 8.

The ball retainer 10 comprises a rectangular block 10' apertured for the accommodation of the screw 12. Aligning pins 18 and 19 on opposite sides of the screw 12 longitudinally of the assembly and extending parallel to the screw 12, secure the ball retainer block 10' against rotary displacement with respect to the clevis 7. A pair of L-shaped flat springs 20 and 21 have their left hand ends secured by rivets or screws 24 and 25 to the opposite lateral sides of the block 10'. The depressed right hand ends of the springs 20 and 21 yieldingly grip the ball 4 therebetween. The anvil 6 may be a cube from which a pin 22 projects. The pin 22 fits snugly into an aperture extending axially of the tongue of the clevis 8 and retains the anvil 6 in place.

The wedge 5 has an inclined right hand face which engages correspondingly inclined aperture faces on the tines of the clevis or fork 7. The inclination of the right hand face of the wedge 5 and of the clevis tines it contacts preferably is less than the friction angle of from 6 to 7° for steel against steel. The left hand face of the wedge 5 is normal to the longitudinal axis of the assembly and is parallel to the opposite face of the anvil 6. The right hand surface of the wedge receiving aperture in the tongue of the clevis 8 is spaced from engagement with the right hand face of the wedge 5 to assure flush contact between the right hand face of the wedge 5 and the tines of the clevis 7.

The wedge 5 and the anvil 6 preferably are made of hardened high carbon chrome-vanadium steel of SAE 6150. The wedge 5 and the anvil 6 illustratively may be heat-treated to 1550 to 1600° F. quenched in oil and drawn at 500° F. to a hardness of 56 Rockwell. The clevises or forks 7 and 8 preferably are made of steel of SAE 4130. The forks 7 and 8 illustratively may be heat-treated to 175,000 pounds per square inch before their finish machining. The wedge 5, the anvil 6, and the forks 7 and 8, illustratively, may be given a black oxide finish. A cadmium plate finish where appropriate, illustratively, may be given to the other parts of the assembly.

The ball 4, illustratively, may be made of a copper, a precision mild steel of SAE 1113, or other suitable material which undergoes accurate and reproducibly uniform calibration deformation under compression load. In experimental use, a ball ¼ of one inch in diameter recorded tension forces up to 3,000 pounds pull and a ball ⅜ of one inch in diameter recorded tension force up to 6,000 pounds. The ball is measured with vernier calipers accurately, rapidly and easily before and after it is deformed. The difference in least diameters, before and after the deformation, records the compression force to which the ball has been subjected.

The force gage calibration curve 23, in the graph of Figure 5 of the accompanying drawing, has been plotted accurately from experimentation confirmed by commercially available force gage information. The curve 23 indicates the magnitude of force required to compress the ball 4 of a prescribed composition and dimension. The graph reads along the abscissa in thousandths of an inch difference in least diameters of the ball and along the ordinate in pounds of compression force applied to the ball. A fresh ball is used for each test.

In the use of the graph in Figure 5, a difference in least diameters, obtained from measurements of the deformation of a ball and expressed in thousandths of an inch, is located along the abscissa of the graph and is projected upwardly to its incidence with the curve 23, from which it is projected to the left to its incidence with the ordinate where a reading is taken of the pounds of tension force which has been applied to pull apart the forks 7 and 8 and deform the ball to the extent measured.

Modifications of and within the scope of the present invention include a Brinell hardness device and procedure whereby the ball 4 is made of an extremely hard and incompressible material and the wedge 5 is of a relatively soft material. Measuring the diameter of indentations into the wedge by such a ball, in conformity with usual Brinell practice, is a measure of the compression force applied between the ball and wedge and of the tensile force pulling apart the clevises 7 and 8. This method is not preferred because the indentations are so small, require magnification and have less range and accuracy than with a deformable ball and hard wedge. Modifications in the shape of the ends of the clevises or forks 7 and 8 and in the shape of the ball 4 are within the scope of the present invention.

The present invention is inclusive of the described processes for measuring and recording a maximum tensile force by its conversion into a compression force by which a deformable object is compressed to a measurable degree.

The gage and its parts which are shown and described herein have been submitted for purposes of illustrating and describing an operative embodiment of the present invention and similarly functioning modifications and substitutions may be made in its parts and process without departing from the scope of the present invention.

What I claim is:

1. A force gage permanently recording a maximum tension to which the gage is subjected, comprising the combination of a first clevis having an elongated tongue portion remote from a first attaching means for the gage, a second clevis having a bifurcated portion to receive the first clevis tongue portion therebetween remote from a second clevis attaching means for the gage, laterally withdrawable wedge means extending through the first clevis elongated tongue portion and through the second clevis bifurcated portion in keying the two clevises together with the bifurcated portions of the second clevises positively bracing the wedge means against its rotation within the assembly, a deformable member readily accessible from outside the untensioned gage and with the gage under tension the deformable member is subjected to a compression force against the wedge means by the first clevis tongue portion in measuring the magnitude of an applied force acting in a direction to separate the first clevis tongue portion from between the second clevis bifurcated portion, an anvil means actuated by the first clevis tongue portion in the application of force to the deformable member in causing it to permanently record the magnitude of a tensile force to which the force gage may be subjected.

2. A force gage, comprising a pair of overlapping clevises subjected to a force directed toward their separation when the gage is subjected to tension, a laterally withdrawable wedge extending through the pair of clevises and the wedge having a first face making less than a right angle with one of the clevises engaged by the wedge and the first wedge face being spaced out of engagement with the other clevis and the wedge supported against its rotation by the wedge engaged clevis and the wedge having a second face making a substantially right angle with both clevises, an anvil suported by one of the clevises and with one face opposed to and substantially parallel with the second face of the wedge, and an openly exposed and directly accessible deformable member between the opposed wedge and anvil faces and indicating by its compression the magnitude of a tensile force to which the gage is subjected.

3. A force gage, comprising in combination a pair of clevises with overlapping portions, a first laterally withdrawable wedge means positively secured against rotation within the assembly and removably and adjustably keying together the overlapping portions of the pair of clevises, an anvil supported by the clevises and with the wedge providing a pair of flat surfaces substantially normal to the longitudinal axis of the clevis overlapping portions, an openly exposed and directly accessible removable and replaceable compressibly deformable member between the pair of flat surfaces, and retaining means maintaining the pair of clevises overlapping portions in assembled condition.

4. A force gage permanently recording the magnitude of a tensile force to which the gage is subjected, comprising the combination of a first fork provided with a pair of tines extending substantially parallel with each other away from a first securable fork end, a second fork provided with a single tine insertable between the pair of tines of the first fork and extending away from a second securable fork end, an assembly retention first screw threading through one of the pair of tines of the first fork with the screw tip seating within an aperture in the second fork tine to restrict the displacement of the two forks with respect to each other, an indeformable wedge with flat opposite sides inclined with respect to each other and which wedge extends through the first fork pair of tines with a first wedge face in engagement with the tine faces inclined from a direction normal to the axis of the tine assembly and the wedge presenting a second face normal to the tine assembly, a coil spring retained with the assembly by having substantially its midportion clamped thereto by a securing action of the first screw and the coil spring terminating remote from its midportion secured by the first screw in a pair of spring tips which point substantially toward each other and being housed in sockets in the wedge for the yielding retention thereof as a part of the assembly, an indeformable anvil dimensioned to fit between the first fork tines and provided with a pin housed in an aperture in the second fork tine so that the anvil presents a flat face normal to the axis of the fork tine assembly and substantially parallel with the wedge face normal to the tine assembly, a deformable ball between the opposed parallel faces of the wedge and the anvil, and a ball retainer yieldingly securing the ball substantially intermediate the lateral edges of the tine assembly and comprising a pair of L-shaped flat springs, a ball retaining block to the lateral sides of which attached ends of the flat springs are secured, screw means attaching the ball retaining block to one of the first fork tines, and aligning means positioning the unattached tips of the flat springs in a predetermined relation with the fork tine assembly.

5. A force gage permanently recording the magnitude of a tensile force to which the gage is subjected, comprising the combination of a first clevis provided with a pair of tines extending away from one end of the first clevis and at the second end of the first clevis having an attachable portion equipped for the application of a tension force thereto, a second clevis provided with a tongue extending away from one end of the second clevis and at the second end of the second clevis having an attachable portion to which tension may be applied and the second clevis tongue insertable between the first clevis tines, an indeformable anvil seating in a slot in the first clevis tines and positioned in a slot in the second clevis tongue and providing a flat face normal to the axis of the assembled first and second clevises, a laterally withdrawable indeformable wedge braced against rotation by the first clevis tines and providing a flat face spaced from and substantially parallel to the anvil flat face, and a substantially spherical ball removably insertable into the untensioned clevis assembly between the anvil flat face and the wedge flat face to make a single point compression contact with each face in opposing substantially all tension force applied to the clevis' attachable portions.

References Cited in the file of this patent

UNITED STATES PATENTS

| 815,468 | Du Pont | Mar. 20, 1906 |
| 2,362,484 | Hickman | Nov. 14, 1944 |

FOREIGN PATENTS

| 1,021,770 | France | Feb. 24, 1953 |